RECORDER UTILIZING ELECTROSTATIC CHARGES

Filed Sept. 9, 1959

3 Sheets-Sheet 1

INVENTOR.
JOSEPH T. McNANEY
BY
Carl R. Brown

INVENTOR.
JOSEPH T. McNANEY
BY
Carl R. Brown

INVENTOR.
JOSEPH T. McNANEY
BY
Carl R. Brown

United States Patent Office 3,071,645

Patented Jan. 1, 1963

3,071,645

RECORDER UTILIZING ELECTROSTATIC CHARGES

Joseph T. McNaney, La Mesa, Calif., assignor to General Dynamics Corporation, Rochester, N.Y., a corporation of Delaware Filed Sept. 9, 1959, Ser. No. 843,328
6 Claims. (Cl. 178—6.6)

This invention relates generally to a recorder wherein electrostatic charges are used to effect recordation of predetermined image patterns.

In the constant search for higher speed recording apparatus and means for today's high speed computing systems, as well as for the increased rate of communications between parties throughout the world, it becomes ever more necessary to record information in a readable permanent, semi-permanent or transitory form for evaluation. A method somewhat similar to the instant invention employs the process known as xerographic recordation. McNaney U.S. Patent No. 2,736,770 exemplifies such an operative system. Basically, a xerographic system responds to spectral radiation, such as light to cause a latent electrostatic image. The latent image is subsequently developed by application of electrostatically charged particles thereto, thus presenting a visual image. The visual image may thereafter be transferred from the xerographic equipment or plate, or may be viewed directly upon the xerographic plate. However, the xerographic equipment has many drawbacks. Among these are the problems of charging and discharging the xerographic plate, cleaning the surface of the plate of the powders or particles and, subsequently replacing the powders onto the plate.

Of course, whether these are plates, or belts, the material used as photoconductors and the like, which constitutes the active variable portion or converting means of the xerographic equipment, is given to great wear and normally does not last too long in operation. This necessitates the continual replacement of the xerographic plate portion of the equipment at frequent intervals. Economical operations therefore are impaired.

Further, the handling of powders in the ordinary xerographic-type-equipment, such as the equipment known by the trademark "Xerox Copyflow" and manufactured by Haloid Xerox, Inc., of Rochester, New York, experiences difficulty in rapid handling of electrostatic powders or particles. Rather elaborate elevator trains and spreading devices are used to handle the particles and to assure uniform flow of powder over the xerographic surface. However, these powders are so fine and minute that each handling or transfer operation causes much dust in and about the equipment. This dust condition at times impairs the operation of the equipment.

In the ordinary xerographic process, in order to provide a record of the visible or developed image from the xerographic plate, it is necessary that the image be transferred by contact to a paper or record medium. Such additional contact further abrades the selenium surface of the xerographic plate, and causes short-lived utilization thereof.

The present invention either overcomes most of these defects or minimizes them to a great extent. Further, the present invention eleminates the normal additional step of developing the latent image into a visible image, and combines them into a single step operation. If transfer of the visible image is desired, the present invention does so by non-contact of the responsive means or xerographic plate, or resistive surface with the record medium. The record medium is merely placed adjacent, but in spaced apart relation, to the responsive surface.

The invention utilizes basically a surface which is either electron or light permeable, or both, capable of holding the electrostatic charge in its charged condition, or its non-responsive condition. Electrostatic charged powder particles are thereafter applied to the surface. The charge carried by the powder particles is preferably opposed to that of the surface. Therefore, the powder particles will be electrically attracted to the surface. While the resulting image recordation may remain for use on such surface, it may be desirable to record the image elsewhere. For that purpose there may be placed immediately below the surface, and adjacent but spaced apart from the adhering particles, a record medium.

In the responsive state of the surface, the powder particles repelled therefrom are deposited upon the record medium in a pattern corresponding to the image information. The image information may be presented to the surface as electron charges or light converted into electron charges. The resulting electron charges, corresponding to the image information, are of substantially a like polarity with respect to that of the particles, and cause the particles attracted to the surface of that area to lose their attraction and to be repelled therefrom. Repulsion of the particles causes them to drop away from the surface. The surface thereafter has developed thereupon a visible image of the information. In addition, if desired, the particles repelled may be deposited on the record medium positioned therebelow, in a manner somewhat similar to that in which dust is deposited on a table top. The record medium therebelow will provide an image pattern in reverse of the image on the surface of the responsive means. However, it should be understood that it is not necessary to the basic invention to employ the record medium, as there may be instances in which the initial image pattern already developed on the surface of the responsive means or member or the converting means, may be used as the end image pattern.

While one embodiment of the present invention envisions the utilization of xerographic plate-like construction, another embodiment of the invention utilizing a resistive surface envisions the use of an electron permeable (and light transparent, if desired) electron resistive material. Such a substance among others is exemplified by material known by the trademark "Mylar," manufactured by E. I. du Pont de Nemours and Company, Inc., of Wilmington, Delaware.

As previously stated, while it may be desirable to record the image information on the record medium for utilization, there does exist on the resistive surface, or on the surface of the photoconductor layer of the xerographic plate, image information, although in reverse form which can be used directly therefrom. It is only necessary to the invention to develop the latent image into a visible image. Therefore, the surface, whether it be of the resistive material or the surface of a photoconductor of the xerographic construction, is initially charged with a predetermined electric charge. Thereafter, powder particles, either in liquid suspension or dry powder form, are provided with an electrostatic charge opposed to that of the charge of the surface. These powder particles are then applied to the surface and generally uniformly disposed thereupon. As the particles have an electric charge opposed to that of the surface, the particles are attracted to the surface. Thereafter, presentation of image information in the form of the electron charges, either directly or as light subsequently converted into electron charges, causes the resistive member of the photoconductor layer to respond, whereupon electron charges opposed to that of the original charge of the surface are presented upon such surface. This causes the original charges on the surface to be neutralized and supplanted with a charge in the area of the image information of like polarity of the particle charge. The like charge presented at the surface causes the particle to be repelled from the surface. If desired, the particles may be deposited upon or attracted to the record medium, or the particles may just be repelled from the surface, leaving upon the surface image information.

While but the rudiments of the invention have been explained, it should be understood that many preferred embodiments thereof are possible. The application discloses several embodiments employing the invention.

The novel features that are considered characteristics of this invention are set forth with particularly in the appended claims. The invention itself, both as to its organization and method of operation, as well as additional objects and advantages thereof, will best be understood from the following description when read in connection with the accompanying drawings, in which:

Figure 3:
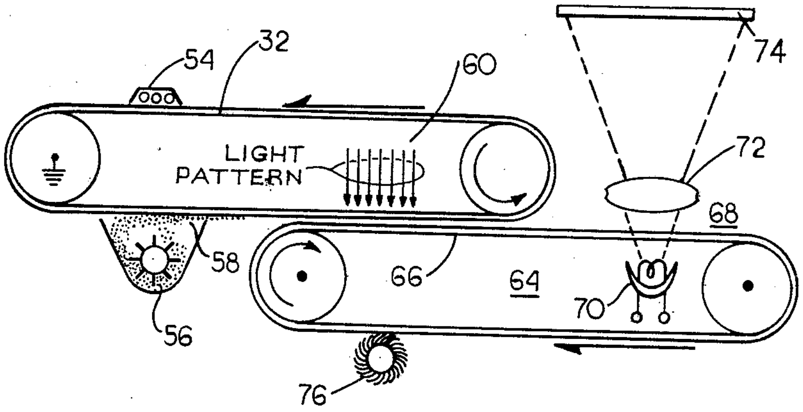
Figure 4:
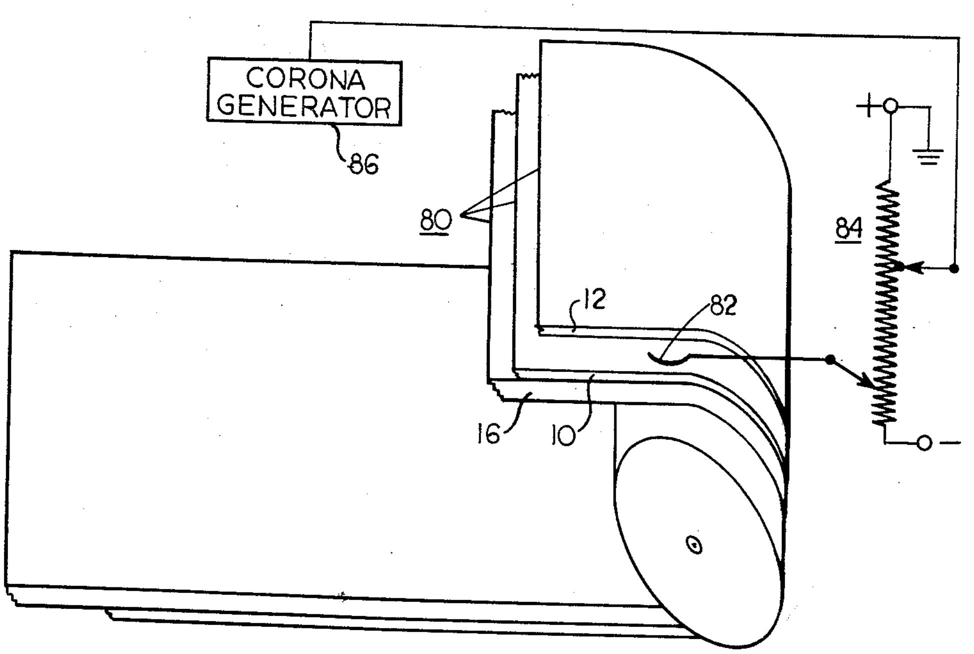
Figure 5:
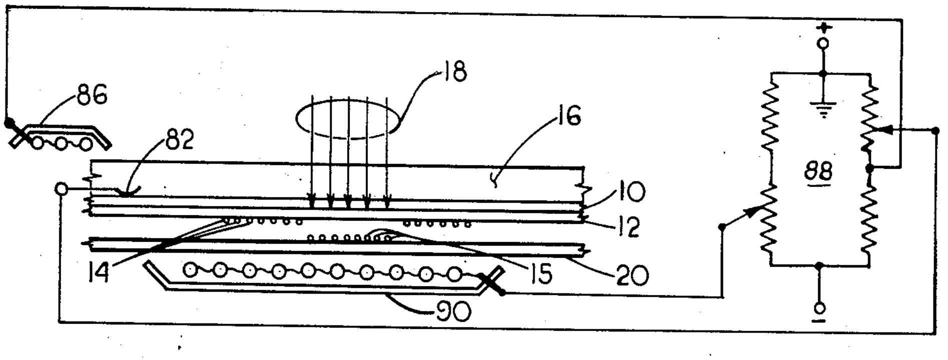
Figure 6:
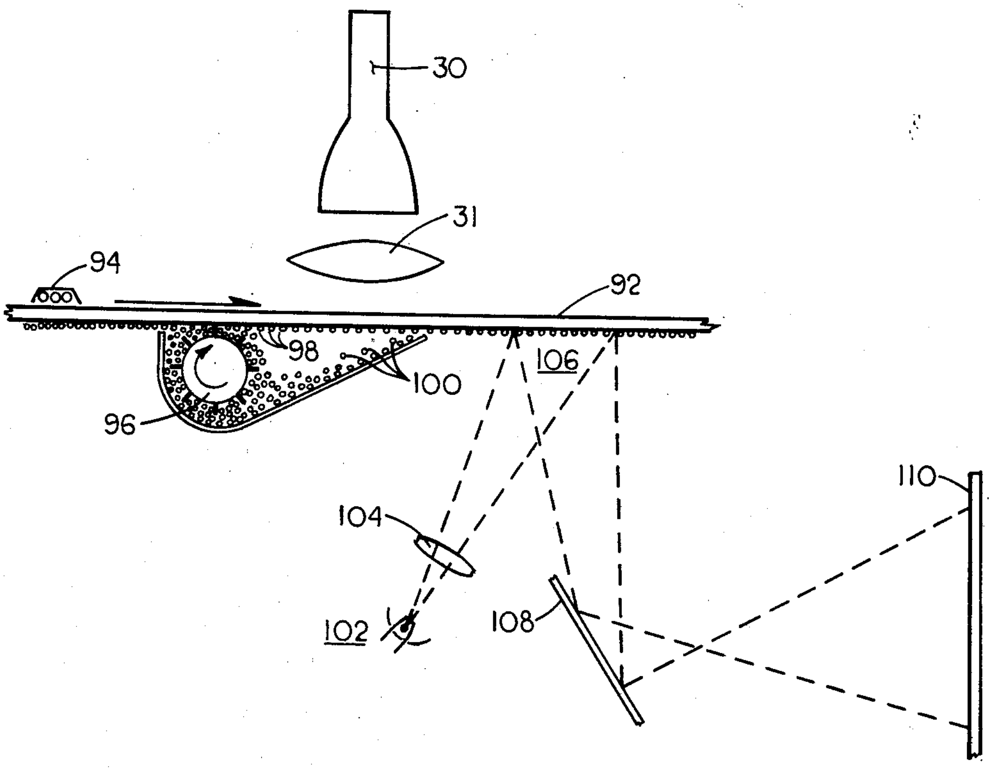

FIGURE 3 schematically shows another embodiment of the present invention utilizing an endless belt responsive means and an endless belt record medium which is light permeable; therefore, after recordation of the image thereon and subsequently thereto the image on the record medium may be light irradiated and transferred therefrom by light projection to a screen;

FIGURE 4 is a further detailed view of a particular embodiment of a responsive means or member utilizing, for example, a photoconductor layer upon a conductor layer disposed upon a transparent backing, which is shown in isometric projection, the construction being schematically connected to a potential source, as well as a wiper blade, thereby transferring the potential from the source onto the conductor layer;

FIGURE 5 is a further embodiment of the invention in which there is utilized beneath the record medium additional electron charges to aid the transfer of the repelled charged particles;

FIGURE 6 is a schematic view of still another embodiment of the invention in which the negative image formed upon the surface is irradiated thereupon and reflected therefrom for projection onto a screen for viewing.

Figure 1A:
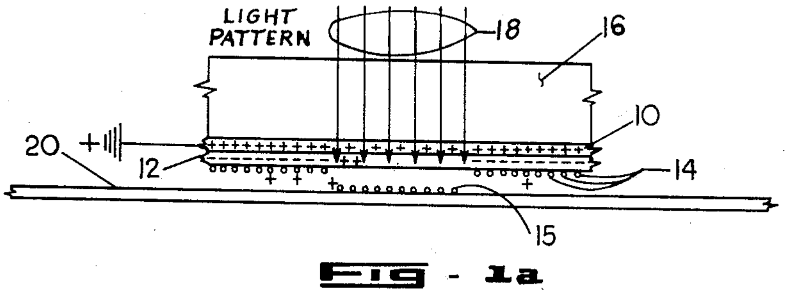
FIGURE 1 is a schematic view of the two basic embodiments of the invention, and is set forth as FIGURES 1(*a*) and 1(*b*)
Figure 1B:
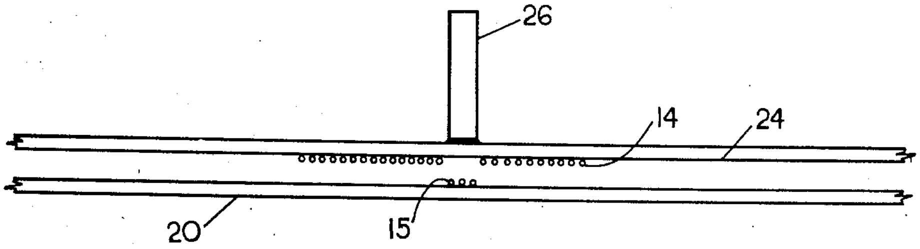

Referring more particularly to FIGURE 1, there is exemplified in FIGURE 1(*a*) a schematic of the basic construction utilizing, as a means responsive to image information and for converting the image information into electron charges, a light transparent conductor layer 10 and a photoconductor layer 12 overcoated and disposed thereupon. Transparent conductor layer 10 may utilize any well-known light transparent conductor material and may be made of a conductive glass known by the trademark "NESA," made and sold by the Pittsburgh Plate Glass Company of Pittsburgh, Pennsylvania. Of course, other light transparent thin layer conductor materials could also be used. Photoconductor layer 12 may utilize a thin photoconductive material. Such photoconductive materials may be selected from materials having such properties including selenium, cadmium, sulphide, silver selenide, germanium, sulphurs, anthracine and anthraquinone, and other like known materials. Each of these materials has the property of having a very high electrical resistance in a dark or light excluded condition, and a low resistance or good conductivity of electricity in a lighted or illuminated condition.

A potential may be impressed upon the conductor layer 10 when the photoconductor layer 12 is in its dark or non-conducting state. The potential so impressed remains only on conductor layer 10. The photoconductor layer 12 also has impressed on its surface opposed to the conductor layer 10 a potential condition opposed in polarity to that of the conductor layer 10.

Minute powder particles 14 capable of accepting and retaining an electrostatic charge are cascaded over or disposed upon the charged surface of the photoconductor layer 12. Particles 14 may be in powder form, as is taught by D. L. Fauser et al., U.S. Patent No. 2,824,813, and Heyford, U.S. Patent No. 2,808,023. Of course, any of the aforestated mechanisms may be used in order to place the powder in immediate adjacency upon or over the charged surface of photoconductor layer 12. The powder particles 14 may, of course, also be suspended in liquid, such as is taught in Mayer et al., U.S. Patent No. 2,891,911, or Mayer U.S. Patent No. 2,892,709, each of the particles being charged with a charge opposed in polarity to that of the surface charge of photoconductor layer 12. The charged powder particles 14, being of a polarity opposed to that of the charges on the surface of the photoconductor layer 12, are attracted to and adhere to such surface, said layer 12 being in the non-responsive or dark condition.

If it is desired for construction strength, the conductor layer 10, the photoconductor layer 12, and the adhering particles 14 may all be carried by conductor layer 10 or carried thereby upon a transparent support 16. The support 16, it should be clearly understood, is not necessary to the invention; it may merely be desirable.

Thereafter, the embodiment of FIGURE 1(*a*) may receive image information as light radiation or patterns 18. The light patterns 18 are transmitted through the conductor layer 10 and upon the photoconductor layer 12. Photoconductor layer 12, irradiated by light patterns 18, becomes conductive in the areas irradiated. In the area of the irradiation, therefore, the charges shown for purposes of exemplification as negative, are conducted through the more positive conductor layer 10 to ground. The more positive charges of the conductor layer 10 are now conducted in the irradiated areas of photoconductor layer 12 to its surface adjacent the oppositely charged particles 14 adhering to the surface of the photoconductor layer 12. These particles 14 are repelled from the surface in the irradiated area of photoconductor layer 12, and therefore drop away from said surface. The resulting developed image information appears upon the surface of the photoconductor as areas of maximum particle adherence, areas of non-particle adherence, and areas of partial particle adherence.

While the image recorded by the absence of particles 14 on the surface of the photoconductor layer 12 as, for example, the "negative" image thereof, is usable if desired, the repelled particles may also be deposited upon a record medium 20 placed beneath the surface of layer 12. The particles 15 in the simplest form are deposited upon record medium 20 by gravity. The record medium 20 may utilize any well-known record medium such as paper, electrically resistive surface, xerographic plate, and the like. The image recordation upon the record medium 20 provides a reversal or "positive" image recordation of the image information originally presented in FIGURE 1(*a*) as light patterns 18. The essentials of the invention thus far reside in the converting of light patterns into electric charge conditions and presenting the latter to the surface of the responsive member or photoconductor 12, thereby causing like electric charges to repel the charged particles 14 from the photoconductor 12.

A further embodiment of the invention utilizing the same inventive principles is shown in FIGURE 1(*b*). FIGURE 1(*b*) utilizes a resistive material 24, to whose charged surface oppositely charged particles 14 are caused to adhere. Conductor means 26, utilizing electrically conducting pins or wires, conduct image information presented thereto as electrical charges to or adjacent the resistive layer 24. The resistive layer 24, being electric-charge permeable, permits the influence of such electrical charges, when of a polarity the same as that of the charged particles, to permeate therethrough, thereby neutralizing the charge upon its surface and further repelling particles 14 from the surface of the resistive layer 24 as repelled particles 15.

Resistive layer 24 may utilize, for example, the material known by the trademark "Mylar." This material is thin enough to permit the electric charges presented thereto to affect the electron charges on the opposite surface through the resistive layer 24. The charged particles adhering to the precharged surface of the layer 24 will be repelled therefrom by the electrical charges presented by conductors 26. The repelled particles 15 are so deposited on record medium 20 in the area of electric excitation through the layer 24.

While FIGURES 1(*a*) and 1(*b*) set forth the present invention in its rudimentary form, many embodiments thereof may be made.

Stated once more, the basic concept of the invention resides in charging of the surface of an electrically resistive body; adhering electrostatically charged powder particles to that surface; then either conducting away the charge (or neutralizing it) from the electrically resistive body or layer upon selective energization thereof under the influence of either light or electric information; breaking the adherence of the charge particles to the surface, thereby providing the recording of the light or electric image information upon the surface.

Figure 2:
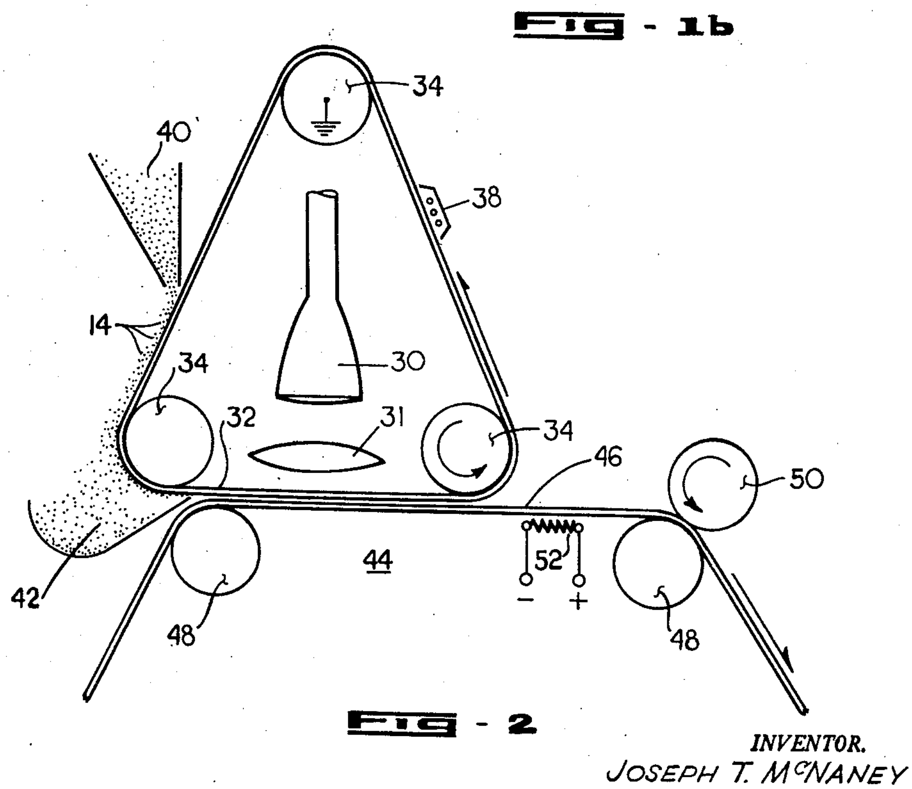
FIGURE 2 is a schematic representation of the invention utilizing an endless belt construction, and moving record medium.

FIGURE 2 of the invention shows a desirable embodiment of the invention, and may utilize the teachings of either FIGURE 1(*b*) or 1(*a*), but for exemplification purposes only, the construction of FIGURE 1(*a*) is used. In FIGURE 2, the image information is presented in light form on the surface of a cathode ray tube 30. A tube such as the shaped beam tube may be used. Such tube is sold under the trademark "Charactron," and is made by Stromberg-Carlson, General Dynamics Corporation at San Diego, California. The image presented by the tube may be projected by a lens 31 onto the responsive or converting means 32. Means 32 is constructed as shown in FIGURE 1(*a*), and includes the conductor layer 10 and the photoconductor layer 12. The responsive means 32 of course could also be made in the manner shown as FIGURE 1(*b*), wherein the image information is presented to a series of conductors or pins, for example, which in turn conduct electrical current or charges to the responsive means 32.

Adverting to FIGURE 2, it is preferable to construct means 32 as an endless belt means mounted upon a plurality of pulleys 34. One of the pulleys 34 is electrically grounded and furnishes the ground return for the conductor layer 10. This pulley, or another of the pulleys 34, is rotatingly driven to furnish the driving or rotational power for the endless belt means 32. As shown in FIGURE 2, the surface of the responsive means 32 may be charged in its dark or non-responsive condition by a corona electron discharge device 38, as is well-known in the art. Of course, light would normally be excluded from means 32 except at the area of recordation. Electrons are thus placed on the surface of responsive means 32 charging the surface of photoconductor layer 12. The charged surface of belt means 32 is presented to a powder particle cascading means 40 which cascades over the charged surface oppositely charged particles 14. The oppositely charged particles 14, of course, electrically adhere to the charged surface of the responsive means 32. The excess of the particles 14 may be deposited in a bin 42.

Placed below, adjacent and in close proximity to the area adjacent responsive means 32, at which recordation from the information means 30 is projected onto the responsive member 32, is positioned a record means 44. Record means 44 is exemplified as a paper 46 for receiving thereupon the repelled particles 15 referred to in FIGURES 1(*a*) and 1(*b*). The reversed or "positive" image of the image information upon the responsive means 32 is deposited upon the record means 44. The record means 44 may have its actual recording surface or paper 46 in motion. The paper 46 may be driven by utilizing a plurality of idler rollers 48 and a driven roller 50. It is desirable to move the paper at a surface speed the same as that of the surface speed movement of the responsive means 32. This will eliminate blurring of the recorded images on the record means 44. If the record means 44 uses a paper 46, the powder deposited thereon may be fused into the paper by use of heater elements 52. It should be understood that, while the record means 44 herein embodies, as an example, a paper 46, the powder could also be deposited upon a resistive surface, such as "Mylar," and transferred therefrom onto another surface or paper if so desired, and this is included in the invention.

FIGURE 3 is a further embodiment of the invention in which the responsive means is again shown as an endless belt 32, and may include either the resistive layer for receiving and responding to electronic charges using pins or conductors adjacent thereto in accordance with FIGURE 1(*b*), or a conductor layer having disposed thereupon a photoconductor layer using a light source as is shown in FIGURE 1(*a*). For purposes of exemplification, the latter is shown in FIGURE 3. Here again, the responsive means or belt 32 may be charged upon its outer surface by a corona charge from a corona charging means 54. After the surface is charged, it is presented to the particle cascading means 56. Particle cascading means 56 provides the electrostatically charged particles and cascades them over and against the charged surface of the responsive means or converting means 32. The particles 58 adhere to the surface as previously explained, in that the particles with a charge opposed in polarity to that of the charge upon the surface of the responsive means 32, causes the particles 58 to electrostatically adhere to the charged surface.

At a subsequent station with the particles 58 adhered to the responsive member means 32, the light source 60 provides the image information to be recorded upon the responsive means 32. The light source 60 renders the photoconductor layer of means 32 conductive. This causes the charge on the conductor layer to neutralize the charge on the surface of the photoconductor layer. The conductor layer electrical charge condition which is a like charge to that of the particles 58, is presented adjacent the particles 58 whereby the particles 58 are repelled away from the responsive means 32 in the areas of the light irradiation. The pelled particles are then deposited upon record means 64. Record means 64 is shown utilizing an endless belt 66 which may preferably be made of the resistive type transparent material known as "Mylar."

The belt means 66 moves at the same surface speed as the surface speed of the responsive means 32, thereby avoiding distortion or blurring of the recorded images. Subsequent to the recordation of the image on the resistive belt 66, the image recordation is presented at a further station 68. At this further station 68 a light source 70 positioned within the belt means 66 is caused to illuminate or irradiate the image recorded upon the belt 66 therethrough. The irradiated image through belt 66 is then projected through lens 72 onto a record material, such as screen 74, for either direct viewing or recording thereupon. Preferably screen 74 is one capable of reflecting the light image for viewing such as the movie screen. The embodiment of FIGURE 3 therefore shows a very simple and straightforward construction in which the light source provides image information, which information causes the repulsion of particles 58 from the responsive means 32 and deposited upon the record means 64. The endless belt record means 66 transports the recorded image to the light source 70 for irradiation onto the screen 74. The image may be removed from the record belt means 66 by a brush 76, for example, to thereby recondition the belt means 66 for subsequent recordation.

FIGURE 4 shows a further embodiment in which the responsive means 80 comprises essentially the construction shown in FIGURE 1(*a*), wherein the backing or support 16 has disposed thereupon the conductor layer 10 which further has disposed thereupon the photoconductor layer 12. As the conductor layer 10 must constantly be provided with an electron charge, a wiper arm 82 is provided for wiping contact with and against the conductor layer 10. A simple potential source 84 is shown which is utilized to provide potential to the wiper arm 82 and to a corona generator 86 (shown in FIGURES 2 and 3 as 38 and 54).

FIGURE 5 shows a further embodiment of the invention utilizing the construction of FIGURE 1(*a*) and FIGURE 4, in which the support 16 carries the conductor layer 10 and the photoconductor layer 12 which is disposed upon the conductor layer 10. The wiper arm 82 places a continuing charge condition on the conductor layer 10. The source of light radiation 18 is used to impart the image information which, in turn, causes the repulsion of the adhering particles 14. Particles 14 are repelled and deposited upon the record means 20 as particles 15. A potential source 88 may be utilized to furnish both the corona generation or charging means 86 and the potential for the wiper arm 82. An additional potential 90 or electrical charge condition may be placed beneath the record means 20. Potential source 90 preferably is of such polarity and strength as to provide a charge which will attract the repelled particles 15 toward and to the record means 20. Potential source 90 therefore provides positive motion patterns to the repelled particles.

FIGURE 6 shows a further embodiment of the invention in which there is utilized, similar to FIGURE 2, a cathode ray tube 30 for the presentation of light image information. Lens 31 projects the information onto converting means or responsive member 92. Responsive member 92 may be constructed in accordance with FIGURE 1(*a*). However, it should also be understood that if the information were in the form of electron charge patterns, the construction of FIGURE 1(*b*) could be utilized to supplant that of FIGURE 1(*a*), which is used to exemplify the construction of FIGURE 6. The responsive means or converting means 92 is provided with a corona charge from the corona generator or charging means 94 to provide the particle carrying surface of means 92 with a uniform charge condition. A particle cascading means 96 subsequently disposed beneath the responsive means 92 cascades the electrostatically charged particles onto the surface of the photoconductor layer of means 92. The charged particles 98, being of a polarity opposed to the charge of the surface, adhere to the photoconductor layer of means 92. Subsequently, the responsive means 92 is presented beneath the image light source or image information 30, 31. Projection of the image information thereupon causes certain of the particles 98 to drop away as particles 100 in the areas of the light illumination. There is left on the surface of the responsive means 92 the fully developed image presented to the responsive means 92. Thereafter, the image on the responsive means 92 is transported into a subsequent position where light source 102 through its lens 104 irradiates the area 106 upon the responsive member 92. The recorded image of the light information at area 106, through the use of a property of a photoconductor to reflect light, is reflected onto a mirror 108, for example, for further reflection and projection onto a screen 110 for viewing a viewer.

It should be noted that in the systems described, as the image that remains on the responsive member 92 is transported beyond the point of recordation or illumination thereof, it is not necessary to remove the image from the responsive means 92. However, it is only necessary in accordance with the invention that powder be subsequently cascaded over the remaining image. Additional charged particles (after recharging the surface of the responsive means 92) cause the powder particles to be uniformly distributed over the surface of the responsive means 92. It is now again ready for the subsequent receipt of image information and the further repelling of particles in the area of electrical charge presentation, either under light illumination or electrical charge conditions, providing a further image recordation. Therefore, the photoconductor layer or the resistive layer, whichever may be used as the responsive or converting means, in any of the embodiments shown, will have a long useful life, as it is not necessary to constantly abrade the surfaces through the removal of the charged particles such as is presently the case in ordinary usage of xerographic recording. Of course, it should be understood that in using resistive layers for the recording means or for the original converter and responsive means, it is possible to provide a thin light transparent metallic mirror backing not shown on the Mylar material to effect the construction of the resistive endless belt means, for example, to supplant the photoconductor type responsive member as shown in FIGURE 6 and other figures. Therefore, the embodiments shown in FIGURE 1(*a*) and 1(*b*) can be used interchangeably throughout the constructions and further embodiments as shown in the specification without departing from the spirit of the invention.

In the embodiments utilizing record mediums, it is desirable that the record medium be disposed adjacent but spaced apart relation to and below or beneath the converting means to thereby take advantage of gravity as the repelled particle falls from the responsive or converting means. In an embodiment such as FIGURE 5, use of the added potential 90 permits positioning of the record medium thereabove or below, or other places, as long as the potential source 90 provides sufficient attraction and direction to the repelled particles 15 to cause them to be deposited on the record medium. The electrical potential, such as 90, shown in FIGURE 5, merely provides a field of influence so disposed and oriented as to aid in the transfer of the repelled particle means from the converting means to the record medium.

The particular embodiments of the invention illustrated and described herein are illustrative only, and the invention includes such other modifications and equivalents as will readily occur to those skilled in the art, all within the scope of the appended claims.

I claim:

1. The method of printing comprising the steps of positioning on a conductive backing member a photoconductive insulating surface having thereon a uniform charge of one polarity, depositing an oppositely charged uniform film of finely-divided powder material on said photoconductive insulating surface, bringing a printing sheet into proximity with the powder-bearing photoconductive surface, applying a potential opposite in polarity to said one polarity to the conductive backing member and exposing selected portions of said photoconductive surface to the influence of light and thereby breaking the electrostatic attraction between said exposed portions of said photoconductive surface and said powder and causing the potential of said conductive member to repel the powder on said selected portions of said photoconductive surface onto said printing sheet.

2. The method of printing comprising the steps of positioning on a conductive backing member a photoconductive insulating surface having thereon a uniform charge of one polarity depositing an oppositely charged uniform film of finely-divided powder material on said photoconductive insulating surface, bringing a printing sheet into proximity with the powder-bearing photoconductive surface, applying a potential opposite in polarity to said one polarity to the conductive backing member, exposing selected portions of said photoconductive surface to the influence of light and thereby breaking the electrostatic attraction between said exposed portions of said photoconductive surface and said powder and causing the potential of said conductive member to repel the powder on said selected portions of said photoconductive surface onto said printing sheet and fusing the said powder to the said printing sheet.

3. The method of printing comprising the steps of positioning on a conductive backing member a photoconductive insulating surface having thereon a uniform charge of one polarity depositing an oppositely charged uniform film of finely-divided powder material on said photoconductive insulating surface, bringing a printing sheet into proximity with the powder-bearing photoconductive surface, applying a potential opposite in polarity to said one polarity to the conductive backing member, exposing selected portions of said photoconductive surface to the influence of light and thereby breaking the electrostatic attraction between said exposed portions of said photoconductive surface and said powder and causing the potential of said conductive member to repel the powder on said selected portions of said photoconductive surface onto the surface of said printing sheet in proximity to said photoconductive surface and applying a voltage of said one polarity to the opposite side of said printing sheet from the said surface in proximity to said photoconductive surface.

4. The method of printing from a photoconductive insulating member, said process comprising moving said photoconductive insulating member through a charging zone in which a uniform charge of a given polarity is deposited on said photoconductive member, moving said photoconductive member through a powdered material applying zone in which a uniform film of charged finely divided powdered material of a polarity opposite to said given polarity is deposited on one surface of said photoconductive member, bringing a printing sheet into proximity with said one surface of the photoconductive member and a conductive electrode into proximity with the other surface of said photoconductive member, applying the potential opposite in polarity to said given polarity to the conductive electrode and exposing selected portions of said one surface of said photoconductive member within the exposure zone to the influence of light to thereby break the electrostatic attraction between said exposed portions of said photoconductive member and said powder thus allowing the potential of said conductive electrode to repel the powder on said selected portions of the photoconductive member onto said printing sheet.

5. The process of claim 4 further including the step of moving said printing sheet from said exposing zone to a powder material fusing zone at which the powder is fused to provide a permanent image.

6. The process of claim 4 further including the step of moving said printing sheet from said exposure zone to a projecting zone at which the image is projected to display the image.

References Cited in the file of this patent

UNITED STATES PATENTS

| | | |
|---|---|---|
| 2,588,699 | Carlson | Mar. 11, 1952 |
| 2,624,652 | Carlson | Jan. 6, 1953 |
| 2,638,416 | Walkup | May 12, 1953 |
| 2,890,923 | Huebner | June 16, 1959 |
| 2,894,799 | McCreary | July 14, 1959 |
| 2,901,374 | Gundlach | Aug. 25, 1959 |
| 2,924,519 | Bertelson | Feb. 9, 1960 |

FOREIGN PATENTS

| | | |
|---|---|---|
| 817,447 | France | May 24, 1937 |